Nov. 20, 1962 N. S. REYNOLDS 3,064,430
PISTON AND EXPANDER ASSEMBLY FOR HYDRAULIC ACTUATING CYLINDER
Filed May 26, 1958 2 Sheets-Sheet 2
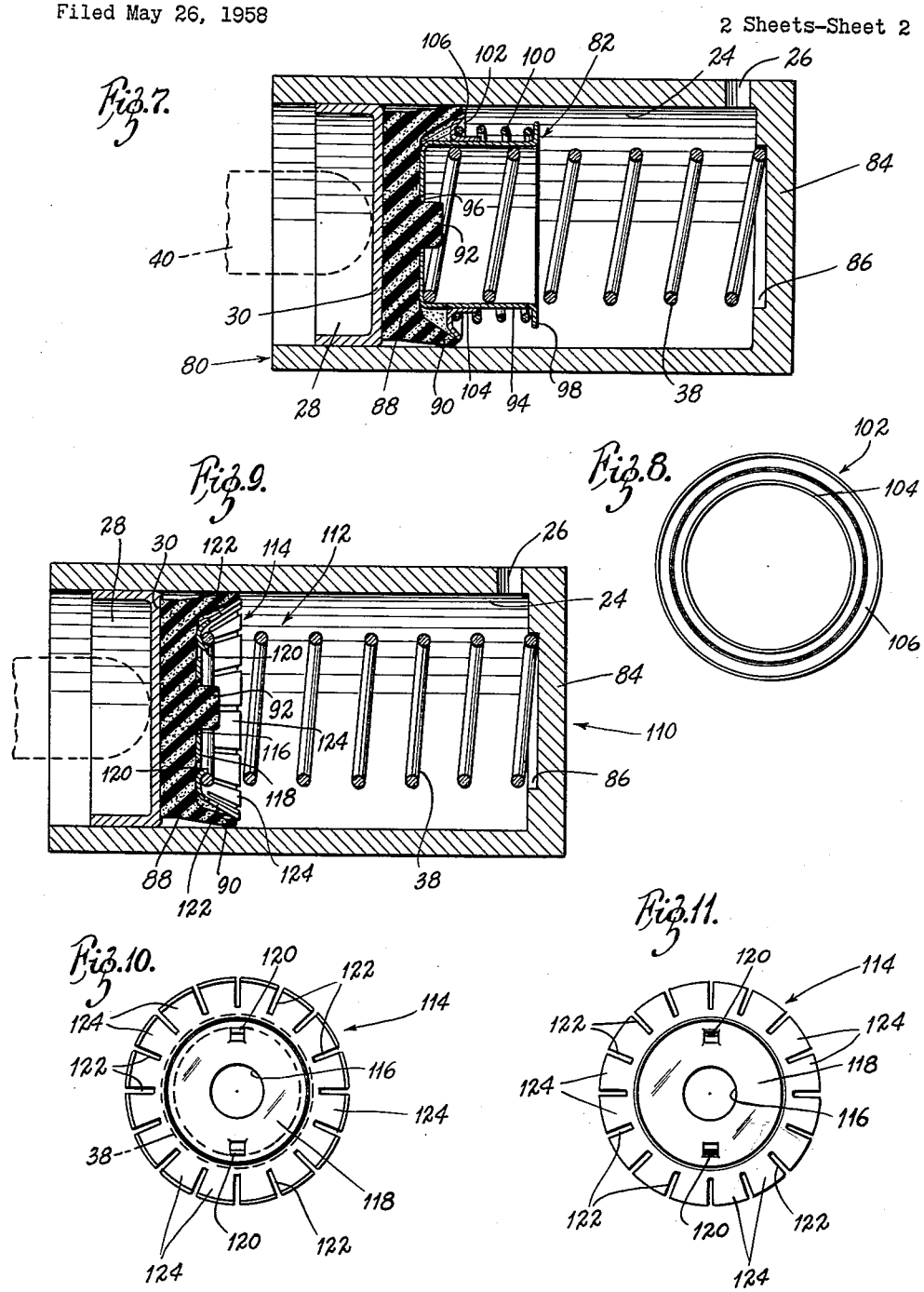
INVENTOR:
NOEL S. REYNOLDS,
BY Kingsland, Rogers & Ezell
ATTORNEYS United States Patent Office
3,064,430
Patented Nov. 20, 1962

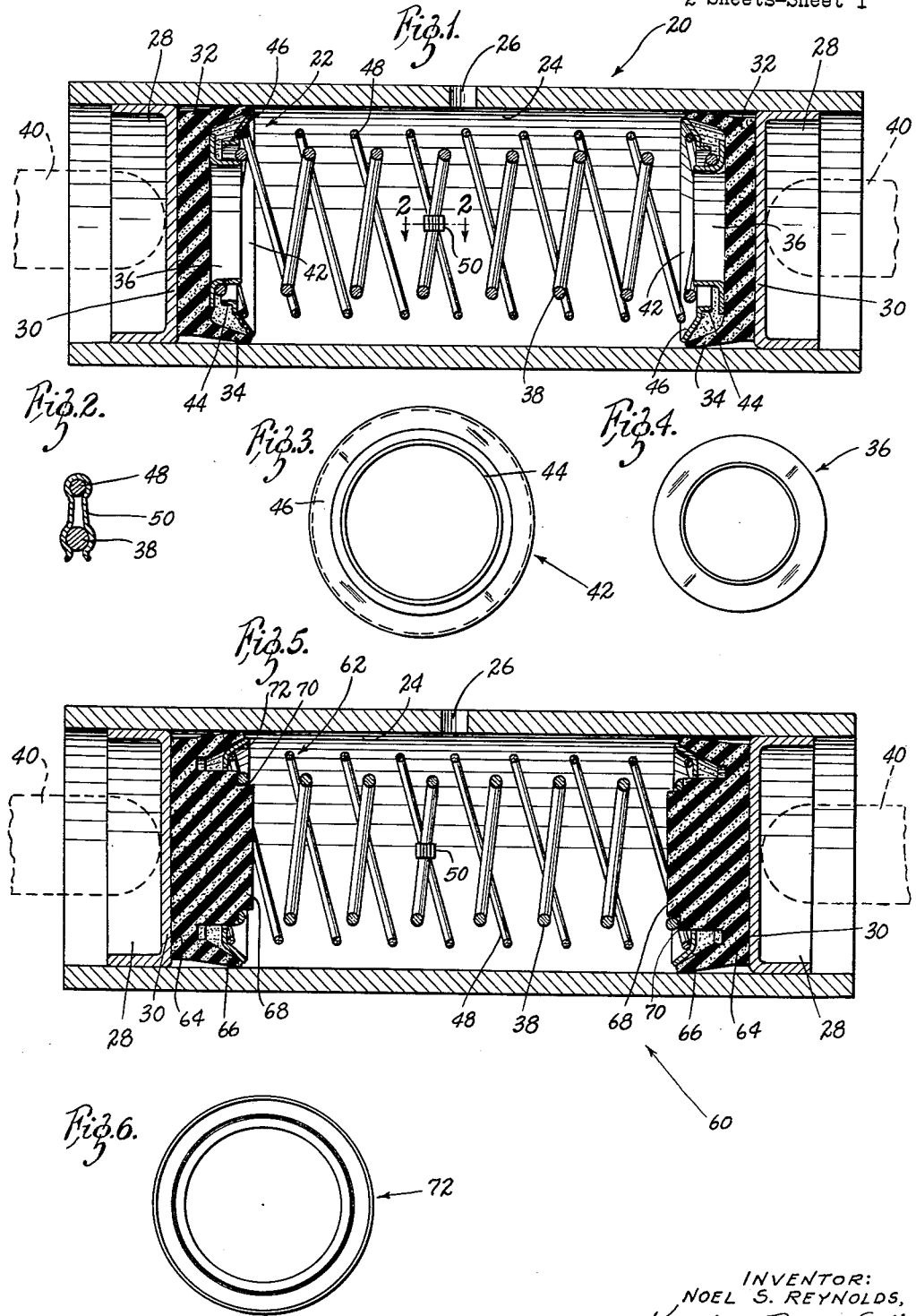

3,064,430
PISTON AND EXPANDER ASSEMBLY FOR
HYDRAULIC ACTUATING CYLINDER
Noel S. Reynolds, 636 Sherwood Drive,
Webster Groves 19, Mo.
Filed May 26, 1958, Ser. No. 737,864
18 Claims. (Cl. 60—54.6)

The present invention relates generally to an improved piston and expander assembly for a hydraulic actuating cylinder. It has particular application to cylinders in which hydraulic force is employed to advance a movable piston in one direction and mechanical force is employed to return the piston to retracted position.

The prevention of fluid leakage from hydraulic cylinders is of primary importance in many installations. Aside from the simple economic loss involved, fluid leakage engenders reduced mechanical efficiency and makes necessary frequent checking and replenishment of the fluid supply. In certain instances, the leaked fluid itself may constitute both inconvenience and hazard to personnel; in other instances, such fluid may adversely affect the operation of adjacent mechanisms.

While piston seals of many types have been used in hydraulic actuating cylinders, the type comprising a cup-like construction of resilient rubber, or like material, disposed flush against a flat faced metal piston has found particular favor. Seals of this type normally depend upon the resilient flexibility of the rubber, as well as upon fluid pressure, to maintain the rim portion of the cup against the wall of the cylinder to effect the seal. But, when the fluid pressure is reduced sufficiently, as during retraction of the piston or during periods between actuation of the cylinder, leakage can and does occur. The condition is, of course, aggravated by loss of resiliency in the rubber due to normal aging.

Since it has been found that this type of seal is made more nearly leak-proof with a predetermined minimum pressure engagement between the rim of the cup and the cylindrical wall with which it cooperates, it has become common practice in certain types of installation to provide expanders for biasing the lip of the seal radially outwardly. However, conventional expanders depend on the angle of the flared expander skirt in relation to axial spring tension to provide both radial bias for the seal and axial return of the piston and expander toward rest position. The difficulties with this arrangement are that a spring of reasonable force for the expander function will generally be too weak to insure full return of the piston and seals, and that the stronger spring required for the return function will provide excessive radial bias to the seals causing them to stick or drag and thus cause erratic and inefficient action. It has also been found that excessive pressure engagement between the cylinder wall and the lip or rim of the cup will cause rapid wear and premature failure of the seal.

It is an object of the present invention, therefore, to provide a novel piston and expander assembly for a hydraulic actuating cylinder which is particularly adapted to minimize interference with the normal operation of cups and their associated parts, and assure a positive contact between seal lip and cylinder wall under varying conditions.

It is another object of the invention to provide a novel piston assembly which employs a cup-like seal and an expander for biasing the seal into sealing engagement with a cylinder wall.

It is another object of the invention to provide a novel piston and expander assembly which employs a cup-like seal having a spring-biased expander.

It is another object of the invention to provide a novel piston and expander assembly which minimizes interference between the sealing function and the piston return function while assuring a positive contact between a seal lip and a cylinder wall under varying conditions.

It is another object of the invention to provide a piston and expander assembly which insures preselected pressure contact between a seal lip and a cylinder wall, together with independent piston biasing means having preselected force for insuring desired action of a sealing assembly under the selected lip pressure.

It is another object of the invention to provide a novel piston and expander assembly utilizing a dual spring arrangement for biasing the piston in an actuating direction under one force while simultaneously biasing an expander in the same direction under a different force.

The foregoing, along with other objects and advantages, will be apparent from the following description of various specific embodiments of the invention as depicted in the accompanying drawings, in which:

FIGURE 1 is a cross-sectional view of a hydraulic actuating cylinder containing a piston and expander assembly conforming to the present invention;

FIGURE 2 is a cross section taken generally along the line 2—2 of FIGURE 1;

FIGURE 3 is an end elevation of a removed expander;

FIGURE 4 is an elevation of a removed spring seat;

FIGURE 5 is a cross-sectional view showing a modified form of piston and expander assembly conforming to the present invention;

FIGURE 6 is an end elevation of a removed expander employed in the piston assembly of FIGURE 5;

FIGURE 7 is a cross-sectional view of another modified form of piston and expander assembly conforming to the present invention;

FIGURE 8 is an end elevation of a removed expander employed in the piston assembly of FIGURE 7;

FIGURE 9 is a cross-sectional view of still another modified form of piston and expander assembly conforming to the present invention;

FIGURE 10 is an end view of a removed expander employed in the piston assembly of FIGURE 9; and FIGURE 11 is an end elevation of the expander of FIGURE 10 as viewed from the opposite end.

Directing attention first to the form of the invention as depicted in FIGURES 1 through 4, the numeral 20 depicts a hydraulic actuating cylinder which incorporates a piston and expander assembly 22 constructed in accordance with the teachings of the present invention. The actuating cylinder 20 is adapted for dual operation and to this end comprises means defining a cylindrical bore 24 which is open at both ends and which is communicated by means of a centrally located passage 26 with a source of hydraulic pressure (not shown).

The assembly 22 is slidably disposed within the bore 24 and comprises a pair of opposed piston members 28 provided with planar inwardly disposed end faces 30. A seal 32 of circular cup-like form is disposed flush against each of the piston faces 30 so that axially extending flange or lip portions 34 extend inwardly toward each other. These seals 32 are molded of rubber, or like material, so as to be flexible and resilient. A spring seat or thimble 36, shown removed in FIGURE 4, and having the angular cross section clearly illustrated in FIGURE 1, is disposed within each of the seals 32 to provide abutments for the ends of a biasing spring 38. Inasmuch as the biasing spring 38 tends to force the opposed pistons 28 farther apart than illustrated, it will be understood that movable mechanical components, such as the finger-like rods or plungers 40, shown fragmentarily in dotted outline, serve not only to limit the separation of the pistons 28 to a predetermined maximum, but also to urge the pistons toward each other against the force of the biasing spring 38.

A ring-like expander 42, shown removed in FIGURE 3, has a cross section (FIG. 1) which includes an inner axial flange portion 44 and a frusto-conical outer flange portion 46. As clearly illustrated, the tapered outer flange 46 is of such size and is disposed at such an angle as to urge the lip portion of the seal flange 34 against the wall of the bore 24 when the expander member 42 is urged toward its associated seal 32. A relatively light spring 48 is disposed circumferentially about the stronger spring 38 and abuts the two expanders 42 so as continuously to bias these members into predetermined expanding engagement with their respectively associated seal flanges 34.

As illustrated in FIGURE 2, the springs 38 and 48 are of opposite hand, and are preferably clipped together by means of a spring clip 50 formed from resilient metal strip to the shape clearly illustrated. The clip 50 facilitates the handling of the assembly 22 prior to and during its insertion into the cylindrical bore 24, and also helps to keep the springs in coaxial, non-interferring relationship to each other.

The modification of FIGURES 5 and 6 takes the form of an actuating cylinder, generally designated 60, containing a piston and expander assembly 62 and having many of the same characteristics and some parts identical with the previously described arrangement. Thus, again, there is illustrated an open-ended cylinder defining a bore 24 and a communicating passage 26 and having disposed therein a pair of pistons 28 retained by abutting plungers 40. In place of the previously described seals 32, however, the assembly 62 incorporates a pair of seals 64, which are also molded from rubber-like materials, but which have, in addition to a flexible axially extending flange 66, a central projection or pad 68 provided with a peripheral groove 70 for receiving the ends of the main biasing springs 38. An expander 72, shown removed in FIGURE 6 and having the simple flared cross section clearly illustrated in FIGURE 5, fits over the pad 68 so that the flared portion may provide a predetermined expansion of the flange 66 into engagement with the bore 24 under the biasing force of the spring 48.

Another modified form of the present invention is shown in FIGURES 7 and 8 as an actuating cylinder 80 containing a piston and expander assembly 82. This embodiment differs from those previously described in that the bore 24 is closed at one end by a wall 84 to provide a single piston arrangement. The communicating passage 26 is located adjacent the wall 84, and the latter has a shallow central cavity 86 for accommodating one end of the biasing spring 38.

In addition to the spring 38, the assembly 82 includes a single piston member 28 retained, as previously described, by an abutting plunger 40. A cup-like seal 88 constructed from resilient rubber-like material includes, in addition to an axial flange portion 90, a central protuberance 92 for positioning a spring retainer 94. This latter member is of generally cup-like form having a central aperture 96 for accommodation of the protuberance 92 and having an outturned flange 98 for seating abutment of one end of a relatively light coil spring 100. The other end of the spring 100 seats against an expander 102 formed with a short sleeve-like portion 104 slidable on the spring retainer 94 and having an outwardly flared flange 106 for expanding engagement with the lip of the flange 90 of the seal 88.

FIGURES 9 through 11 illustrate still another form of the present invention in the form of an actuating cylinder 110 containing a piston and expander assembly 112. Here again is shown a single piston arrangement in a cylinder having a closed end 84 as in the embodiment of FIGURE 7. The assembly 112 utilizes the piston 28, the main biasing spring 38, and the seal member 88 in the same manner as the spring assembly 82 above described. In place of the expander 102 and spring 100, however, the assembly 112 incorporates a spring-type expander 114, shown removed in FIGURES 10 and 11. This spring expander 114 is generally cup-like in form and has a central aperture 116 for accommodation of the protuberance 92 on the seal member 88. The aperture 116 is formed in a flat bottom portion 118 against which one end of the biasing spring 38 abuts and which is provided with deformed tabs 120 for holding the spring 38. A frusto-conical outer portion of the expander 114 is provided with spaced radial slots 122 in a manner to divide the periphery of the member 114 into a plurality of flared spring-like fingers 124 adapted to bias the lip of the seal flange 90 with predetermined force against the inner wall of the bore 24 when the flat portion 118 is retained against the seal 88 by the spring 38.

In use, the several spring and expander assemblies 22, 62, 82 and 112 are disposed in appropriate cylinders as above described. Attention is directed to the fact that each of these assemblies provides a dual spring arrangement wherein one spring is provided for the primary purpose of predeterminately biasing a lip portion of a flexible seal member into sealing engagement with a cylinder wall. The second spring is incorporated in a manner to bias the respective piston members 28, along with their associated seal members, away from the communicating passage 26 and into abutment with the plungers 40. As is well understood, however, the plungers 40 are themselves, normally biased in a direction to compress the springs 38 and discharge hydraulic fluid from the bore 24 in the absence of a predetermined minimum hydraulic pressure communicated thereto. Thus, although the general mode of operation of the actuating cylinders described hereinabove has not been altered, the predetermined independently biased engagement of the seal flanges with the cylinder walls, provides increased efficiency and dependability.

Clearly, there has been provided a plurality of piston and expander assemblies for hydraulic actuating cylinders which fulfill the objects and advantages sought therefore.

It is to be understood that the foregoing description and the accompanying drawing have been given only by way of illustration and example. It is further to be understood that rearrangement of parts, changes in the form of the elements, and substitution of equivalent elements, all of which will be apparent to those skilled in the art, are contemplated as being within the scope of the present invention, which is limited only by the claims which follow.

What is claimed is:

1. In a hydraulic actuating cylinder, in combination, means defining a cylindrical bore and a fluid passage for communicating said bore with a source of hydraulic fluid under pressure, and a piston and expander assembly disposed in said bore, said assembly comprising a rigid piston member reciprocative in said bore remote from said communicating passage, a flexible seal member engaging said piston member and having a flexible peripheral flange for slidable engagement with said cylindrical bore, means including resilient spring means biasing said piston member and said seal member in one direction of their back and forth movement, and means including additional resilient spring means biasing said peripheral flange into pressure engagement with said bore.

2. The combination of claim 1 wherein the piston member and the seal member are axially abutted one with the other so that the seal member is between the piston member and the communicating fluid passage, the peripheral flange on the seal member being formed so as to extend generally axially in the direction of said passage.

3. The combination of claim 2 wherein the spring means biasing the piston member and the additional spring means biasing the peripheral seal flange are concentrically related with the latter being disposed radially outwardly of the former.

4. The combination of claim 3 wherein the means biasing the piston and seal members includes a circular spring seat disposed radially inwardly of the seal flanges and having a transversely extending planar portion in flush abutting engagement with a mating portion of the seal member, said seat being also provided with axially extended means for retaining the seated spring in centered relation thereto.

5. The combination of claim 3 wherein both springs are of helical coil form, the spring biasing the piston and seal members having a greater spring force than the spring biasing the seal flange.

6. The combination of claim 5 wherein the means biasing the seal flange includes a ring-like expander having a central aperture of greater diameter than the maximum diameter of the spring which biases the piston member, said expander having a frusto-conical skirt portion for engaging the free lip of the seal flange.

7. The combination of claim 6 wherein the means biasing the piston and seal members includes a cup-like spring seat having a transversely extending planar bottom portion in flush abutting engagement with a mating portion of the seal member inwardly of the seal flange, a sleeve-like side portion accommodating one end of the spring which biases the piston and seal members, and a radially flanged rim portion providing a seat for one end of the spring which biases the seal flange, the latter spring being disposed over the sleeve-like side portion aforesaid.

8. The combination of claim 7 wherein the seal member has an integral axial protuberance centrally of the flexible flange, and wherein the bottom portion of the cup-like spring seat has a central aperture for centering accommodation of said protuberance.

9. In a hydraulic actuating cylinder, in combination, means defining a cylindrical bore and a fluid passage centrally of said bore for communicating the same with a source of hydraulic fluid under pressure, and a piston and expander assembly disposed in said bore, said assembly comprising a pair of rigid piston members individually reciprocative in said bore and disposed on opposite sides of the communicating passage, an individual flexible seal member having an axially extended peripheral flange disposed flush against the inward ends of the respective piston members so that the seal flanges extend toward each other, primary spring means for biasing the piston members in respectively opposite directions, and secondary spring means for biasing the seal flanges into pressure engagement with the walls of the cylindrical bore independently of the biasing action of the primary spring means.

10. The combination of claim 9 wherein the primary spring means includes a single primary spring of helical coil form interposed between the opposed piston and seal members, and wherein the secondary spring means includes a single secondary spring of helical coil form interposed between the opposed flanges of the seal members, said springs being coaxial with each other, and said primary spring having a greater thrust than said secondary spring.

11. The combination of claim 10 wherein the helical coil forms of the primary and secondary springs are of opposite hand.

12. The combination of claim 10 wherein a spring clip is provided for interconnecting juxtaposed coils of the primary and secondary springs, said clip having spaced detent engagement with said coils.

13. In a hydraulic actuating cylinder, in combination, means defining a cylindrical bore and a fluid passage for communicating said bore with a source of hydraulic fluid under pressure, and a piston and expander assembly disposed in said bore, said assembly comprising a rigid piston member reciprocative in said bore remote from said communicating passage, a flexible seal member engaging said piston member and having a peripheral flange for slidable engagement with said cylindrical bore, and primary spring means for biasing the piston member in a direction away from said communicating passage, and secondary spring means for biasing the seal flange into pressure engagement with the wall of the cylindrical bore, said secondary spring means including a ring-like member having a generally frusto-conical periphery for urging the seal flange toward peripheral expansion.

14. The combination of claim 13 wherein the primary spring means includes a primary spring of helical coil form, and wherein the seal member is provided with an axial protuberance to assist in centering the primary spring within the seal flange.

15. The combination of claim 14 wherein the ring-like member having a flat plate portion interposed between the seal member and the primary spring for seating abutment with the latter is provided also with a radial flange for retaining the secondary spring means, and wherein said secondary spring means includes a helical spring of lighter force than the primary spring.

16. The combination of claim 14 wherein the secondary spring means comprises a generally cup-like spring expander having a generally planar bottom portion and finger-like side elements arranged in overall frusto-conical relation.

17. In a piston having a piston head and an expander, two springs, one being a helical coil spring for biasing the expander in the direction of and against the piston head, and one being a helical coil spring for biasing the expander in a direction transverse to the axis of the piston head, the coil springs being of different size from the axis of each spring to a section and being concentrically mounted, the helical coils of the two springs being wound in opposite directions.

18. In a piston having a piston head and an expander, two springs, one being a coil spring for biasing the expander in the direction of and against the piston head, and one being a spider spring for biasing the expander in a direction transverse to the axis of the piston head.

References Cited in the file of this patent

UNITED STATES PATENTS

| | | |
|---|---|---|
| 2,059,728 | Dick | Nov. 3, 1936 |
| 2,059,729 | Dick | Nov. 3, 1936 |
| 2,060,847 | Bowen | Nov. 17, 1936 |
| 2,232,350 | Swift | Feb. 18, 1941 |
| 2,430,492 | Carlson | Nov. 11, 1947 |
| 2,549,818 | Joy | Apr. 24, 1951 |
| 2,631,906 | Brock | Mar. 17, 1953 |

FOREIGN PATENTS

| | | |
|---|---|---|
| 486,593 | Great Britain | June 7, 1938 |